No. 650,592. Patented May 29, 1900.
E. SCHRÖTER.
BICYCLE LOCK.
(Application filed Oct. 27, 1898.)
(No Model.)
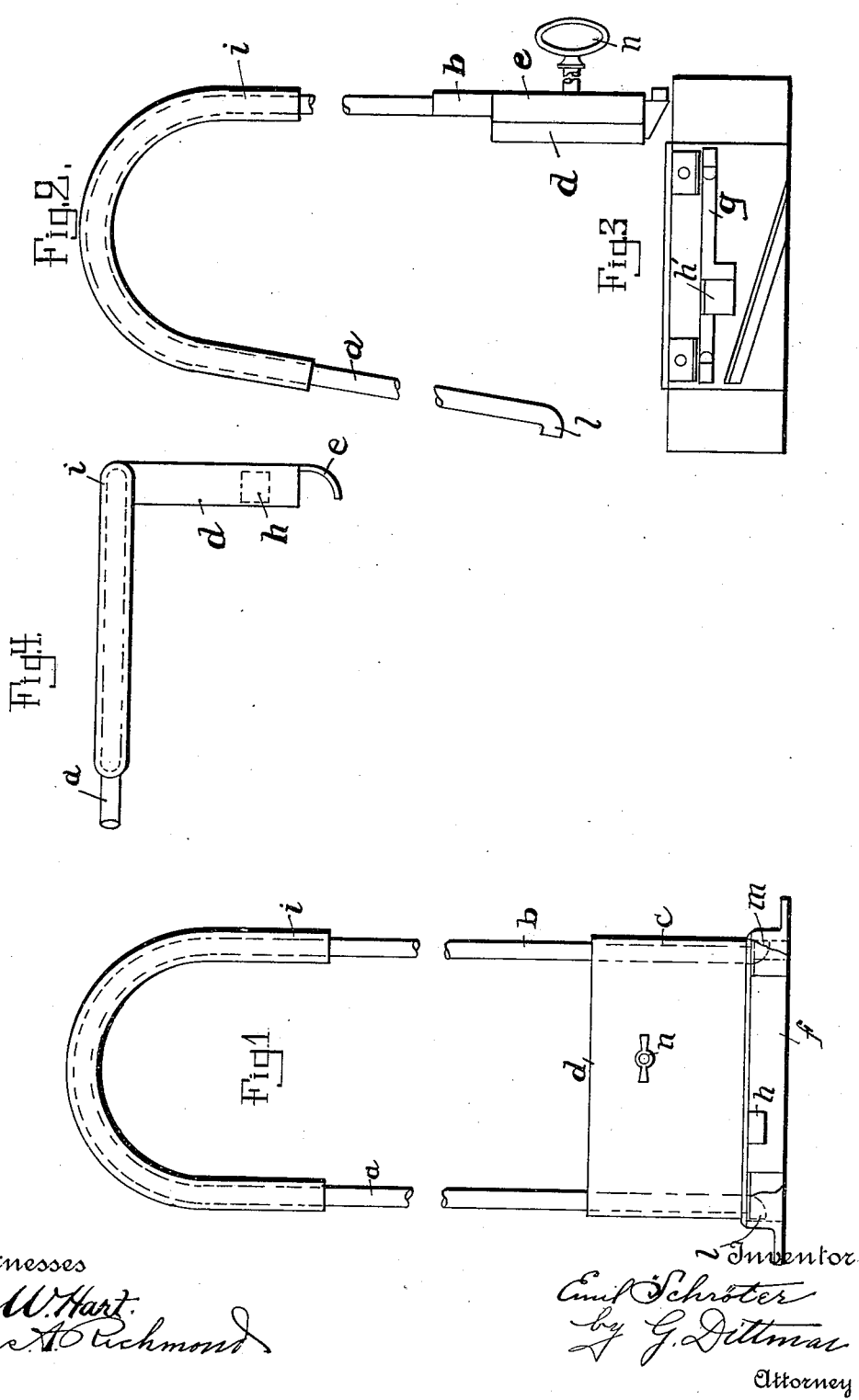

UNITED STATES PATENT OFFICE.

EMIL SCHRÖTER, OF BERLIN, GERMANY.

BICYCLE-LOCK.

SPECIFICATION forming part of Letters Patent No. 650,592, dated May 29, 1900.

Application filed October 27, 1898. Serial No. 694,667. (No model.)

*To all whom it may concern:*

Be it known that I, EMIL SCHRÖTER, a subject of the Emperor of Germany, residing at Stephanstrasse 45, in the city of Berlin, Germany, have invented certain new and useful Improvements in Locking Devices for Velocipedes; and I do hereby declare the following to be a full, clear, and exact description of the invention, such as will enable others skilled in the art to which it appertains to make and use the same, reference being had to the accompanying drawings, forming a part thereof.

The present invention has reference to a bicycle-lock, the object being to provide a two-part locking device consisting of a stationary member adapted to be secured to a building, tree, lamp-post, or any other convenient object and a locking member to accompany the rider, said locking member being adapted to embrace a certain part of the bicycle and to be snapped into said stationary member, as hereinafter described and claimed.

In order to make my invention more readily understood, I have illustrated it on the accompanying sheet of drawings, in which—

Figure 1 shows a side elevation of the two parts making up the locking device locked together. Fig. 2 shows a side elevation of the locking part to be taken along by the rider, one lower end of which carries the lock $d$, which may be moved to and fro around the axle or pin $c$. Fig. 3 is a view from beneath the stationary locking member. Fig. 4 shows a top view of the bent bar or wire $a\ b$ and of the lock $d$, the forward vertical edge of which is hook-shaped, as at $e$.

The locking member to accompany the rider consists of a bent bar or wire $a\ b$, of elastic steel, the curved portion of which preferably is covered with rubber or other soft material $i$ to prevent the parts of the cycle coming in contact with the bent bar or wire from getting scratched. One end of the bent bar is curved out, as at $l$, thereby forming a hook end. The other leg $b$ of the bent bar is rounded off, so as to serve as pin $c$ for the socket of the lock $d$ and is likewise hook-shaped, as at $m$. The tongue $h$ of the lock locks in a downward direction. The other locking part $f$ consists of a metal box which is fastened stationary to the wall of a house, to a tree, to a lamp-post, or the like. In its upper side it is provided with a longitudinal slot $g$ and a wide slot $h'$, opening into the said slot $g$.

If a cycle is to be secured by means of the described parts, the bent bar or wire is passed through the spokes of one of the wheels of the cycle and over the rim or is laid around the steering-post or is passed around some other suitable part of the cycle. The legs $a\ b$ are then pressed together until they can freely pass into the slot $g$ of the stationary box $f$. When the legs are released, the hook-shaped ends $l\ m$ will rest underneath the lateral edges of the slot $g$. The lock $d$ is now swung around so that the hook-shaped front edge $e$ engages the leg $a$ of the bent bar or wire. The tongue $h$ of the lock falls into the slot $h'$, and the device is then securely locked. The lock interposed between the legs $a\ b$ of the bent bar or wire prevents the said legs from being pressed together. In order to release the cycle, the tongue $h$ of the lock is lifted in the usual manner by means of a key $n$, and the lock $d$ is then free to be swung around out of the way of the leg $a$. The bent bar or wire legs are then pressed together, when the hook-shaped ends $l\ m$ can be withdrawn from the slot $g$.

Having now particularly described and ascertained the nature of my said invention and the manner in which it is to be performed, I declare that what I claim is—

1. In a device as specified, a wire bent to form two spring-arms having their extremities formed as hooks, said hooks, a lock adapted to swing upon one of said arms, and a stationary means to receive the spring-arms, including means to engage the lock, substantially as described.

2. In a device as specified, a wire bent to form two spring-arms having their extremities formed as hooks, a stationary means to receive the hooked extremities, a lock adapted to swing upon one of said spring-arms and having a hook to engage the other and a tongue adapted to coact with said stationary means to hold the spring-arms locked, substantially as described.

3. In a device as specified, a wire bent to form two spring-arms having their extremities formed as hooks, said hooks, an elastic covering for the wire, a lock provided with a tongue adapted to swing upon one of said spring-arms and having a hook to engage the other, and a stationary box having a longitudinal slot to receive said hooked spring-arms and a wide slot merging into said longitudinal slot to engage the tongue of the lock, substantially as and for the purpose set forth.

In witness whereof I have hereunto signed my name, this 25th day of July, 1898, in the presence of two subscribing witnesses.

EMIL SCHRÖTER.

Witnesses:
C. H. DAY,
HENRY HASPER.